United States Patent [19]
Seegan

[11] 3,726,348
[45] Apr. 10, 1973

[54] PORTABLE HYDRAULIC POWER TOOL UNIT

[76] Inventor: Anthony J. Seegan, 82 Pratt St., Glastonbury, Conn. 06033

[22] Filed: June 1, 1971

[21] Appl. No.: 148,643

[52] U.S. Cl. ...................... 173/20, 173/33, 173/150, 408/16, 408/126, 408/130, 408/141, 408/702
[51] Int. Cl. ...................... B23b 47/12, B23b 47/22
[58] Field of Search ...................... 408/16, 126, 130, 408/141, 702; 173/150, 33, 20

[56] References Cited

UNITED STATES PATENTS

| | | | |
|---|---|---|---|
| 2,869,403 | 1/1959 | Bent | 408/130 |
| 2,860,531 | 11/1958 | Groff | 408/130 |

*Primary Examiner*—Gil Weidenfeld
*Attorney*—Merrill F. Steward and Donald T. Steward

[57] ABSTRACT

A portable hydraulic power tool is disclosed for applications requiring high torque or rotary motion combined with axial reciprocation in a work arbor. Examples of such applications include various machining operations, particularly drilling or boring of large diameter holes. The tool is especially adapted to provide accurate control of arbor speed, quick reversal of direction of rotation and axial feed of the arbor, and readily variable adjustment of thrust and torque output. To this end the tool utilizes an hydraulic power fed arbor that is both telescopingly reciprocable within a housing and simultaneously rotatable therein, the arbor itself constituting an hydraulic actuator to provide axial power feed while a torroidally arranged hydraulic motor surrounding the arbor produces the rotary drive for the arbor. The tool design affords a unit of improved efficiency, reduced weight and greater compactness, making it possible for a man to carry to a fixed work site a power tool of greater power output capability than conventional power tools of comparable weight and size. The tool housing incorporates an extensible-retractable radial support for the working end of the arbor throughout its axial travel, and torque adapter means are included for securing the tool in place on the work, in order to resist the counter-torque and monitor the force developed during operation.

16 Claims, 18 Drawing Figures

INVENTOR.
ANTHONY J. SERGAN

FIG. 14
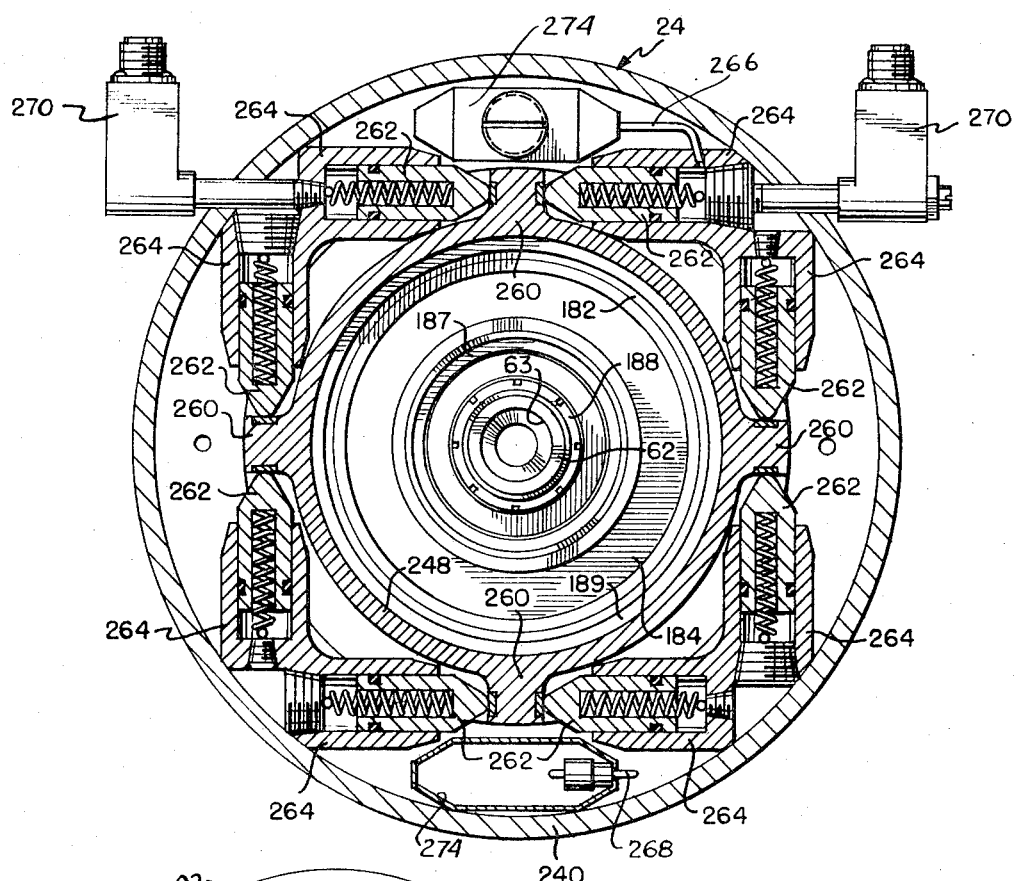
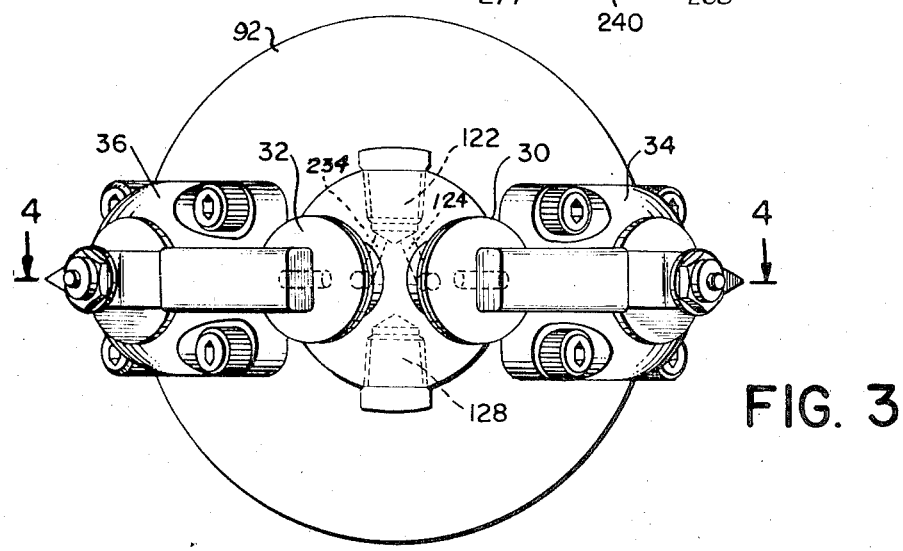
FIG. 3

PORTABLE HYDRAULIC POWER TOOL UNIT

BRIEF SUMMARY OF THE INVENTION

This invention is directed to power units capable of high torque output, yet being of a size and weight which afford reasonable portability by one man, so as to permit the unit to be carried to locations where it would not be possible or practical to lift or use conventional electrically or pneumatically driven units of equal power output. The units of the invention utilize a toroidal hydraulic motor, with or without associated reduction gearing as required, driving a telescoping arbor to produce torque output useful in large-bore drilling or similar applications requiring a high torque, rotary drive. In addition to torque output, the unit provides for powered axial reciprocation of the arbor concurrently with rotation. Power for the motor is supplied through flexible high pressure hydraulic fluid lines from a mobile, remotely positionable hydraulic pump unit. The invention is particularly useful for operations where torque loads may be encountered requiring power sources of, for example, 5 to 10 horsepower rating under conditions which make it impractical or totally impossible to move the work itself to a stationary machine tool installation having the required power capacity. Examples of this are found in the boring of large diameter holes, e.g. 4 to 5 inches or so in diameter, in metal, masonry, rock, etc. Such requirements occur frequently in the construction or modification of ships, submarines, bridges, highway overpass structures, steel or masonry building constructions, mines or well-boring operations, as well as in winching operations, heavy duty mixing and the like.

The invention devices provide substantial advantage over the nearest suitable equipment presently available. Electric powered units of comparable horse power output are too heavy to be carried by a man and manually positioned to perform a drilling, boring, winching or similar operation. Pneumatic power units are limited in practice by safety requirements to maximum system air pressures of around 200 p.s.i. In order to develop large torque outputs, a highly complex and relatively inefficient reduction gear train must be employed, and the speed of the work arbor is reduced accordingly, while the time required to do a given job is correspondingly increased. By way of example, when using the invention device for drilling a 5 inch diameter hole in a steel block forming a gusset in a ship's structure, the boring time can be reduced to as little as one-tenth that required for the same operation using presently conventional pneumatic powered units of comparable weight and portability, i.e. units weighing less that 100 pounds.

The invention is illustrated by embodiment in preferred designs for a drill unit and modification of this which which are shown in the accompanying drawings and described hereinafter.

In the drawings:

FIG. 3 is an end view of the portable drill unit, looking at the end cap at its distal end; i.e., the end opposite that at which a bit or other tool is attached;

FIG. 14 is a transverse sectional view taken on line 14—14 of FIG. 2B;

GENERAL DESCRIPTION OF THE ILLUSTRATED DRILL UNIT

Figure 1:
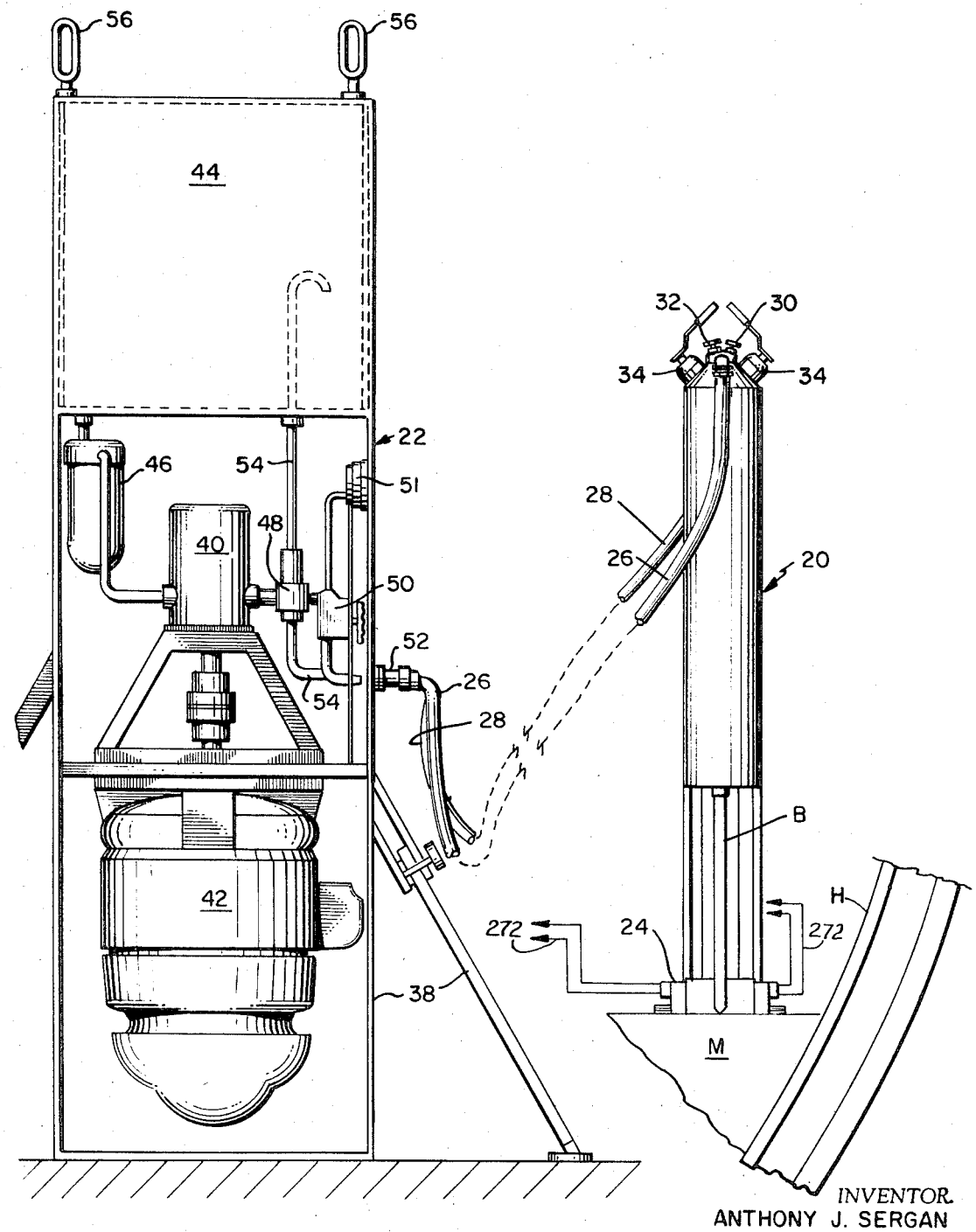
FIG. 1 is a fragmentary schematic view of a portable hydraulic drill set in position to bore a large diameter hole in a gusset member of a ship's hull, and a remote hydraulic pressure pumping unit for supplying the motive power to the drill unit.
Figure 16:
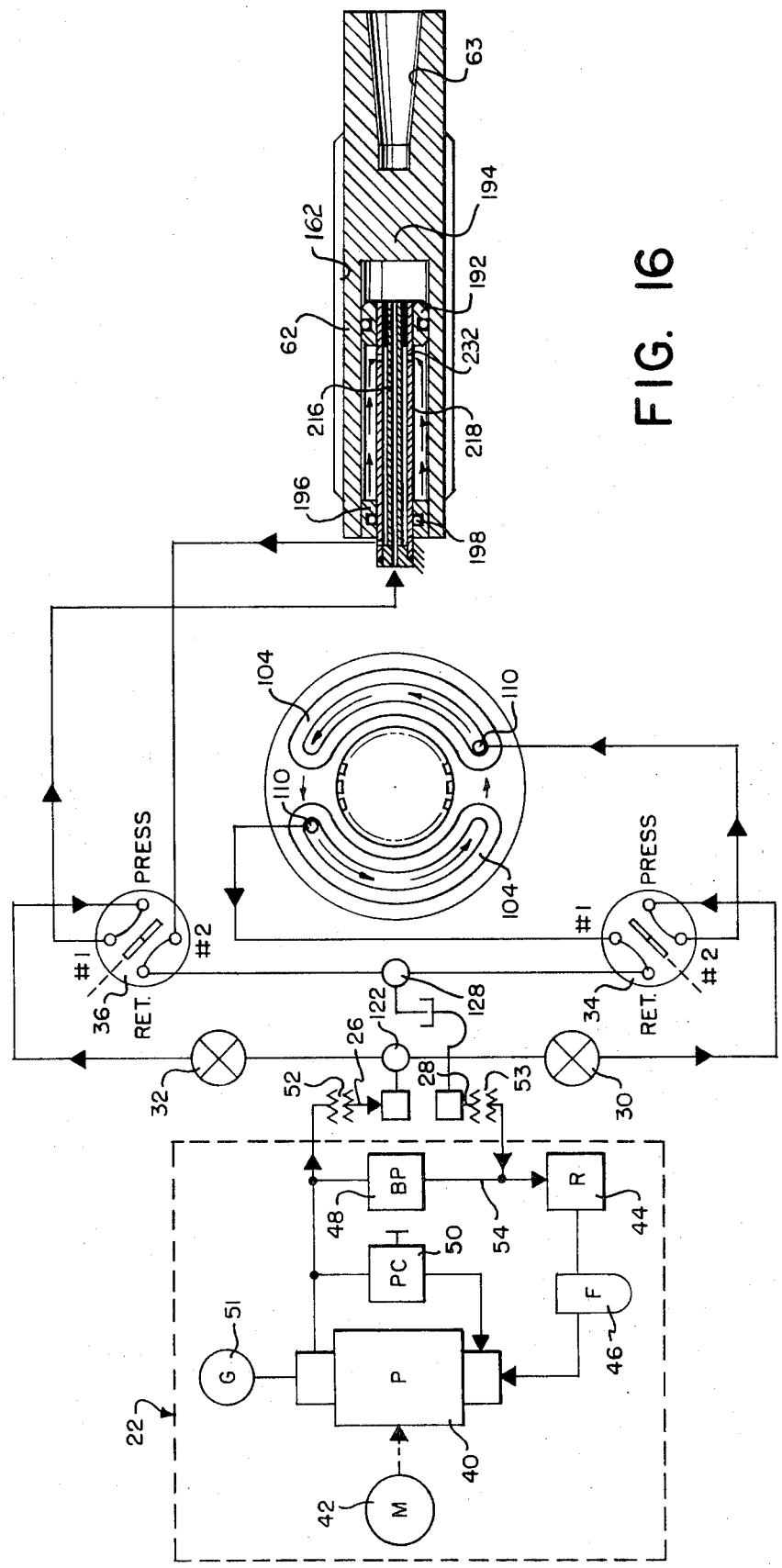
FIG. 16 is a schematic diagram of the hydraulic system for the unit of FIG. 1.

The embodiment of the invention shown in FIG. 1 comprises a portable drill unit 20 and a hydraulic power supply unit 22. The drill is shown in position on a work piece in which a hole is to be bored, in this case a structural member M forming part of a ship's hull H. Drill unit 20 is temporarily secured to the work member M by a torque adapter 24 which serves to counteract the torque and thrust of the drill bit B as this is rotated and axially advanced into the work by drill 20. Flexible hydraulic pressure input and return lines 26, 28, conduct hydraulic fluid between the power supply 22 and drill 20, and the flow of such hydraulic fluid is manually controlled by valves on the drill. Valves 30, 32, are each throttling valves for respectively regulating the rate of admission of hydraulic fluid to control the speed of rotation of drill bit B and the rate of axial feed thereof. Valves 34, 36, control direction of arbor rotation and direction of axial movement, respectively. FIG. 16 shows a schematic of the complete hydraulic system.

Power supply unit 22 comprises a frame or support structure 38 for the various hydraulic components. These components consist of a standard high pressure hydraulic pump 40, and a motor 42 driving the pump. The upper portion of support structure 38 is formed to provide a hydraulic fluid reservoir 44. Fluid is drawn from the reservoir through a filter 46 to pump 40. The pump output is directed through an emergency pressure relief valve 48 and through a manually controlled system pressure regulating valve 50 to a quick-disconnect fitting 52 to which flexible input pressure line 26 is connected. A similar fitting 53 (FIG. 16) is provided for connection of pressure return line 28, and fluid is returned through duct 54 which terminates as a standpipe in reservoir 44. Relief valve 48 is connected across the output and return ducts to by-pass excess system pressure, and valve 50 is located in a by-pass directly around the pump to provide selective control of the system operating pressure which is indicated at gage 51.

The entire hydraulic supply unit 22 comprises a self-contained package which may be hoisted by eye bolts 56 and set in place in the general vicinity of the work to be done, while the operating tool itself, that is drill 20, can be be kept to a size and weight which will enable a man to carry it to the actual work site. A portable tool may thus be provided having a high work output capacity without the disadvantage of much greater weight and size which an electrically powered unit of equivalent work output would necessarily have.

DETAILED DESCRIPTION OF THE PREFERRED DRILL DESIGN

Figure 2A:
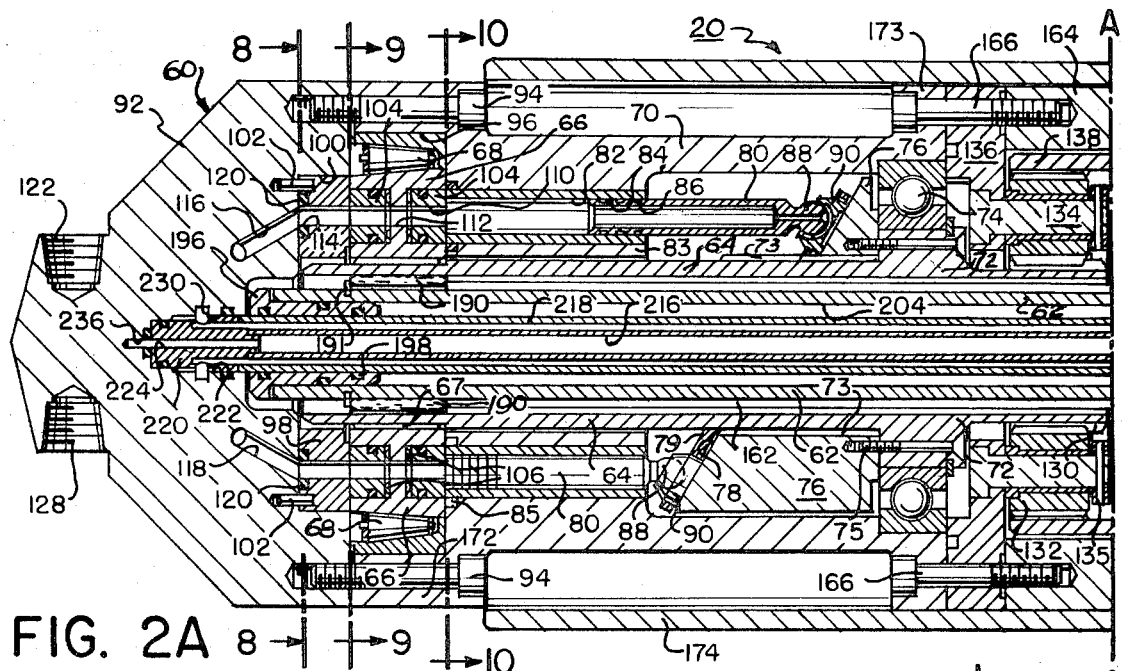
FIGS. 2A and 2B are complementary views which, when joined end-to-end along line A-A, comprise a longitudinal sectional view on line 2—2 of FIG. 5 through the axis of the portable drill unit.
Figure 2B:
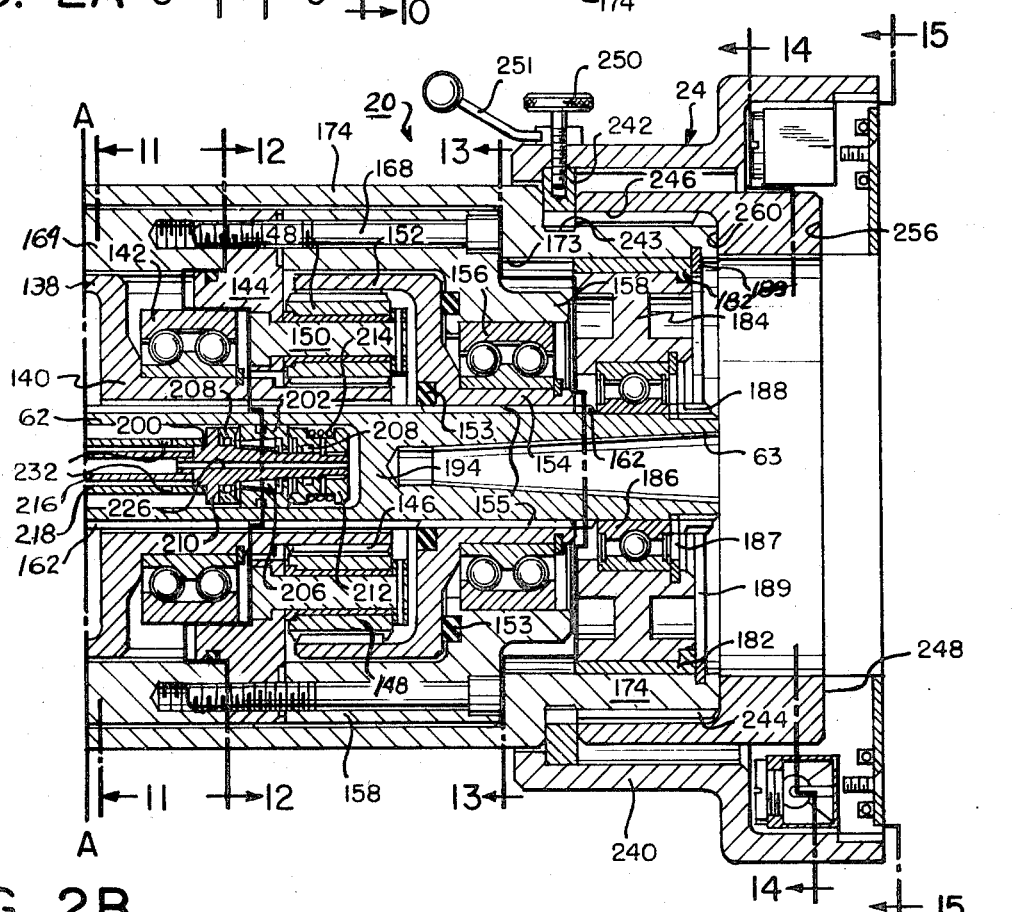
Figure 4:
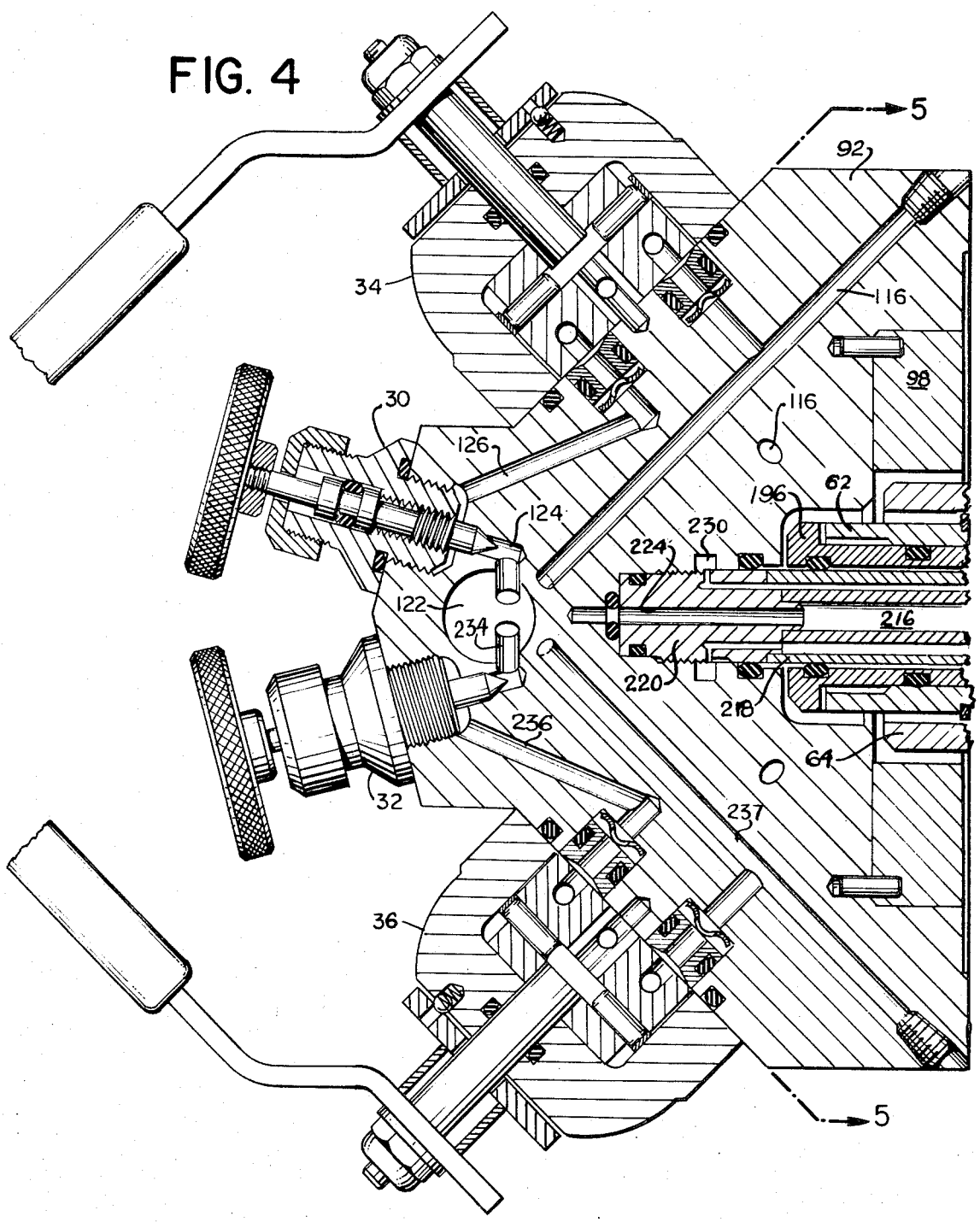
FIG. 4 is a fragmentary cross-sectional view on line 4—4 of FIG. 3 of the end cap and controls for the drill.
Figure 5:
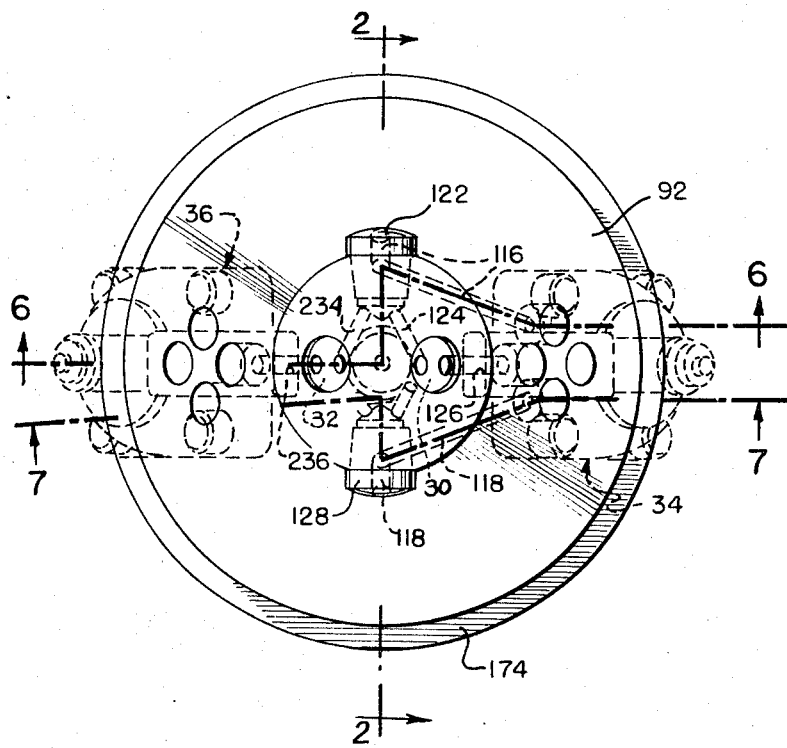
FIG. 5 is a transverse section taken along line 5—5 of FIG. 4.
Figure 8:
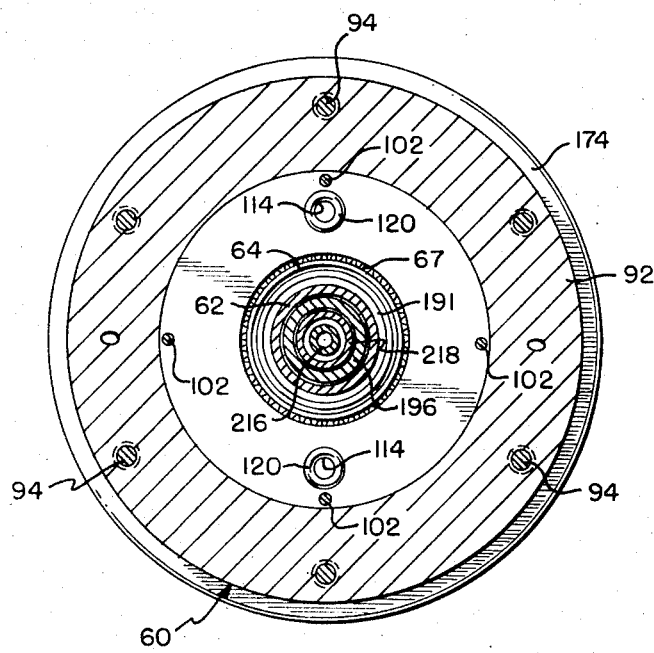
FIG. 8 is a cross-sectional view taken on line 8—8 of FIG. 2A.
Figure 6:
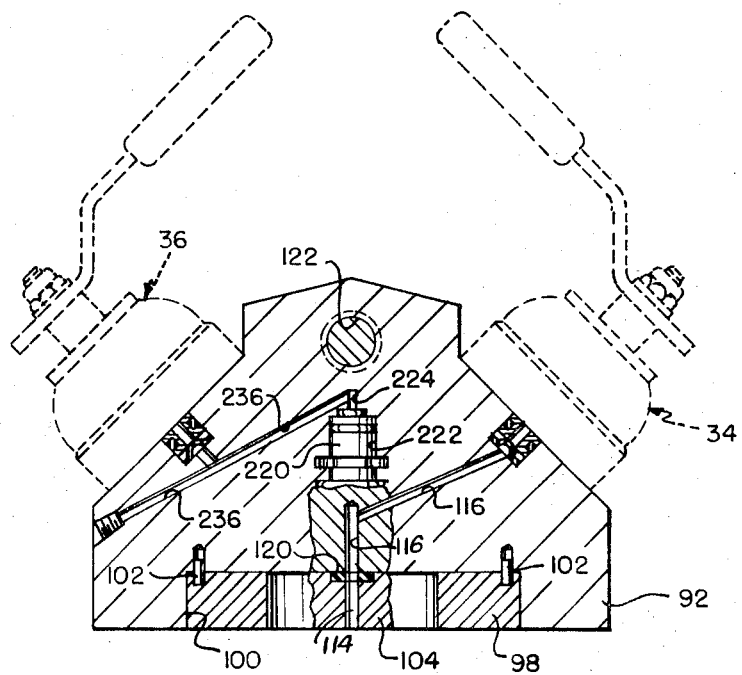
FIG. 6 is a transverse section taken on line 6—6 of FIG. 5.
Figure 7:
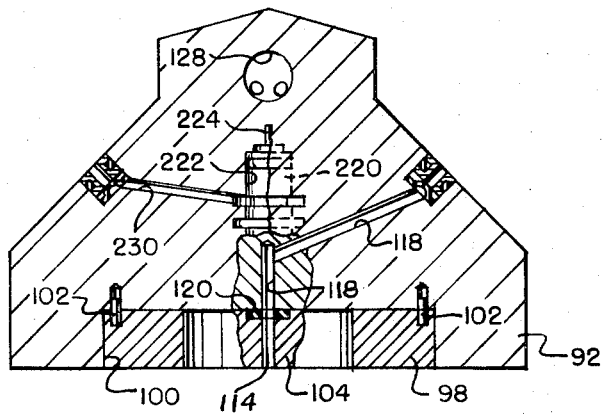
FIG. 7 is a transverse section taken on line 7—7 of FIG. 5.

Referring more particularly to FIGS. 2A, 2B, a transversely sectionalized tubular casing indicated generally at 60 houses a work output member which in this instance comprises a tubular arbor 62. Casing 60 is closed at its distal end, i.e. the left end as viewed in FIG. 2A, and arbor 62 is rotatable and axially slidable in the opposite or working end of the casing. A rotary sliding seal, which will be described more fully presently, surrounds the arbor to seal the working end of the casing. Bearings, also to be described more fully hereinafter, support arbor 62 in housing 60, whereby the working end of the arbor is supported radially at all times during its longitudinal reciprocation, relative to casing 60, between extended and retracted positions. At its exposed or working end, arbor 62 is formed to provide a standard tapered socket or chuck 63 for receiving and retaining the shank of a tool, such as drill bit B seen in FIG. 1. Other power take-off means than chuck 63 could of course be substituted on the arbor.

Figure 9:
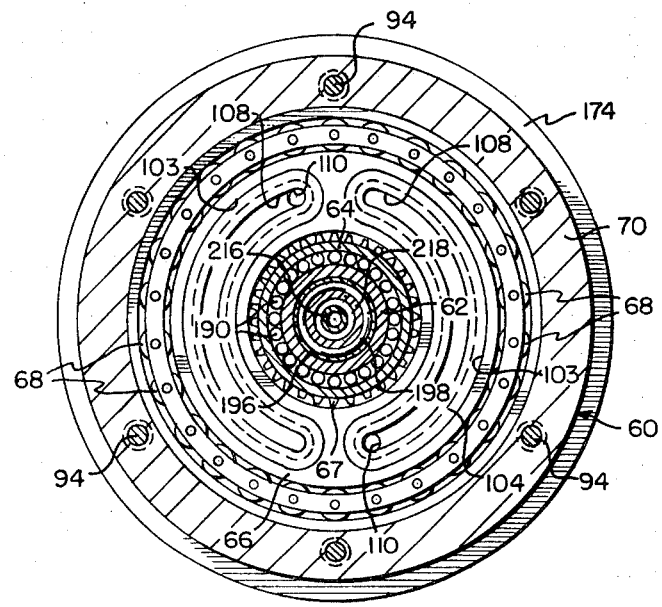
FIG. 9 is a cross-sectional view taken on line 9—9 of FIG. 2A.
Figure 10:
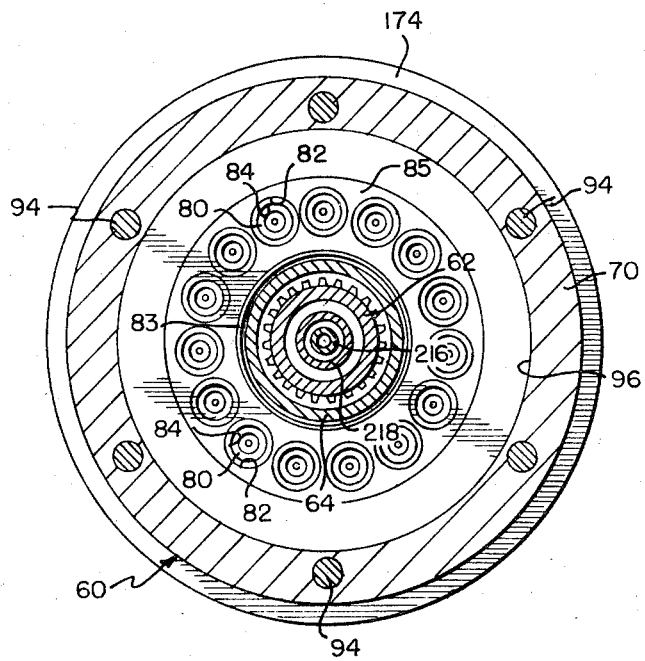
FIG. 10 is a cross-sectional view taken on line 10—10 of FIG. 2A.

The motive power employed to rotate arbor 62 is supplied by a positive displacement hydraulic motor of the wobble or swash plate type, seen more particularly in FIGS. 2A, 9 and 10. The motor comprises a tubular axle 64 adapted to telescopingly receive arbor 62. A rotating pressure balanced port ring or porting collar 66 is splined at 67 to the inner end of axle 64, and tapered roller bearings 68 provide journaled support in section 70 of casing 60 for the inner end of the collar and axle. Axle 64 is formed adjacent its opposite end with a hub 72 which carries the inner race of ball bearing 74, the outer race of which is also supported in casing section 70. Swash plate 76 having a working face 78 disposed at an oblique angle to axle 64 is secured to hub 72, as by splines 73, and a series of motor pistons or hollow plungers 80 is arranged circumferencially about axle 64, in pressure transmitting relation with the swash plate. Pistons 80 are respectively received in cylinders 82 bored through annular wall 83 of casing section 70. These cylinders are bushed with bronze sleeves 84 whose internal surfaces make a fluidtight seal with split-rings 86 confined in the skirt portions of the respective pistons. Sleeves 84 are welded in circumferentially spaced receiving apertures in annular seal and bearing plate 85 recessed in wall 83 of housing section 70 (FIG. 10). Pistons 80 are each formed with a ball head 88 at their exposed ends, and each head is received in the socket of a pressure shoe 90 slidingly engaging the oblique face 78 of swash plate 76. The several pressure shoes 90 are held in circumferential position on the face of the swash plate by radially floating but non-rotating retainer ring 79.

Casing 60 is closed at its distal end (left end as seen in FIG. 2A) by end cap 92 which joins casing wall 70 along a part-line substantially coincident with line 9—9 of FIG. 2A and is secured to the casing wall by bolts 94. End cap 92 confines porting collar 66 for rotation in a counterbore 96 of casing section 70, between the bottom wall of the counterbore and stationary annular port plate 98 received in a complementary counterbore 100 of end cap 92. Plate 98 is pinned at 102 to cap 92 to prevent rotation relative thereto.

Porting collar 66 is provided in each of its axially opposed faces with circumferentially complementary, generally semicircular or kidney-shaped recesses 103, as best seen in FIG. 9. Manifolding inserts 104 of conforming shape are received in each of these recesses and are urged axially outward by wave springs 106 to bear against stationary port plate 98 and stationary annular seal bearing plate 85, respectively. On each of the opposite, axially-exposed faces of manifold inserts 104, a recess or channel 108 is provided conforming generally to the outline of the insert. Each longitudinally correlated pair of inserts 104 is provided adjacent one end of recesses 108 with aligned holes 110, and a registering hole 112 is formed in the intermediate wall of collar 66 to provide fluid communication from one manifold recess 108 to the other. The aligned holes in the two sets of manifolds are in turn oriented diametrically opposite each other relative to axle 64. Annular positioning of these ports relative to motor axle 64 is set to dispose them in axial alignment respectively with the maximum points on the surface of swash plate 76. See FIGS. 2A and 9. Annular port plate 98 is likewise provided with a pair of diametrically opposed drill holes 114 which communicate with internal ducts 116, 118 in end cap 92 for transmission of hydraulic fluid to and from manifold recesses 108 is the rotating porting collar 66.

Operation of the hydraulic motor occurs when hydraulic fluid is admitted to one or the other of ports 114 in annular port plate 98, depending on the setting of valve 24. Such fluid is transferred to the respective recess 108 of the longitudinally related pair of manifold inserts 104 temporarily positioned in communication with that particular port 114 by collar 66 on shaft 64. The communicating manifolds then transmit the fluid to the respective group of pistons 80, positioned circumferentially about axle 64, which at any given moment are interconnected by the manifold recesses. The porting is synchronized to communicate inlet pressure to that group of pistons 80 whose axial thrust produces a camming action through the ball and socket members 88, 90 on swash plate 76 to cause rotation in the desired direction. Simultaneously of course, the remaining group of pistons intercommunicated by the diametrically opposite i.e., fluid return) manifold 104 will be forced back into their respective cylinder sleeves 84 with rotation of the swash plate, thus ejecting hydraulic fluid through the opposite fluid port 114. Manifold recesses 108 are separated circumferentially to exclude two diametrically opposed cylinders 82 at any given rotated position of the porting collar, to allow for transition between pressure feed and pressure return conditions of fluid transmission. The resulting rotational force thus produced on swash plate 76 is transmitted through hub 72 to axle 64, and through suitable reduction gearing to transfer the rotary motion from axle 64 to arbor 62.

The admission of high pressure fluid to the swash plate motor is initially controlled by the previously mentioned flow restricting valve 30 and manual four-way control valve 34 mounted on end cap 92. Referring to FIGS. 4–7, high pressure hydraulic fluid supplied by flexible conduit 26 is introduced at inlet port 122 in end cap 92, and internal duct or passage 124 provides communication to valve 30 (which is here shown as being of conventional needle type). Further internal ducting 126 communicates the outlet of valve 30 to the inlet of four-way control valve 34. The latter is also of standard commercial construction, as for example valves produced by the Barksdale Division of De Laval Turbine Company, Los Angeles, Calif. Detailed description of their construction is therefore unnecessary, while operation of them is evident from the flow diagram of FIG. 16, with further reference to FIG. 5. From this it will be seen that ports in such valves are selectively interconnected in pairs to provide a first or pressure input route for hydraulic fluid from the inlet pressure duct 126 to either of ducts 116 or 118, and a second or return route from the other of said ducts directly to return port 128 in end cap 92. Hydraulic fluid communication to and from the torroidal swash plate motor is thus established.

Referring more particularly again to FIGS. 2A, 2B, and 11, the right hand end of axle 64 is hobbed to provide a sun gear having teeth 130 which mesh with four idler pinions 132 positioned about shaft 64. Idlers 132 are journaled on stub shafts 134 secured in a partition 136, forming a section of casing 60 and are retained on those shafts by a ring 135 by cap screws 137. Idlers 132 also mesh with an internal ring gear 138 formed on or secured as an extension to tubular shaft 140. The shaft and ring gear are coaxial with motor axle 64 and also surround arbor 62. Shaft 140 is supported in bearings 142 whose outer race is pressed into a recess of a second partition 144 forming a further section of the composite casing 60. Shaft 140 is likewise hobbed at its right end as seen in FIG. 2B to provide a sun gear having teeth 146 which mesh with a cluster of four idler pinions 148, each carried on a stub shaft 150 secured in partition 144. Idler pinions 148 mesh in turn with a second internal ring gear 152 having a tubular hub 154. This ring gear and hub are journaled in bearings 156 whose outer race is supported in end wall 158 closing the working end of casing 60. Tubular hub 154 is coaxial with motor axle 64 and arbor 62, and the interior of hub 154 is splined at 155 for mating engagement with longitudinal splines 162 extending along the length of arbor 62. Rotation of the arbor 62 is thus effected at the same speed as ring gear 152. Pressure type rotary seals 153 are provided on the gear hub and in end wall 158 to seal the working end of housing 60.

Figure 11:
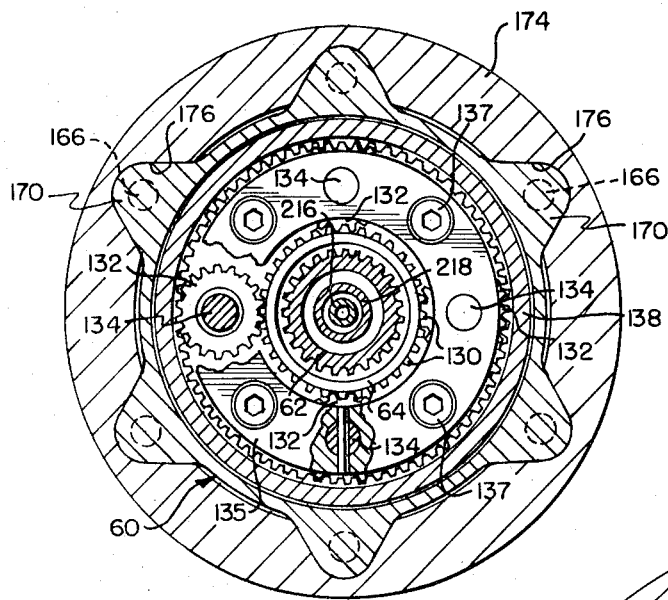
FIG. 11 is a cross-sectional view taken on line 11—11 of FIG. 2B.
Figure 12:
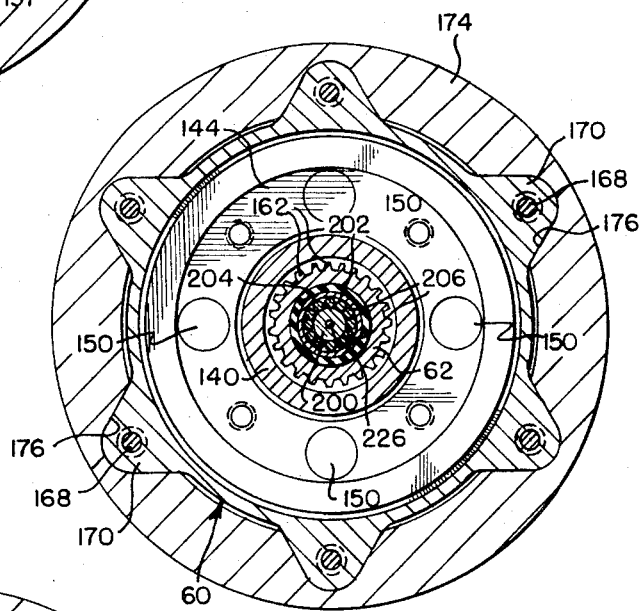
FIG. 12 is a transverse sectional view taken on line 12—12 of FIG. 2B.
Figure 13:
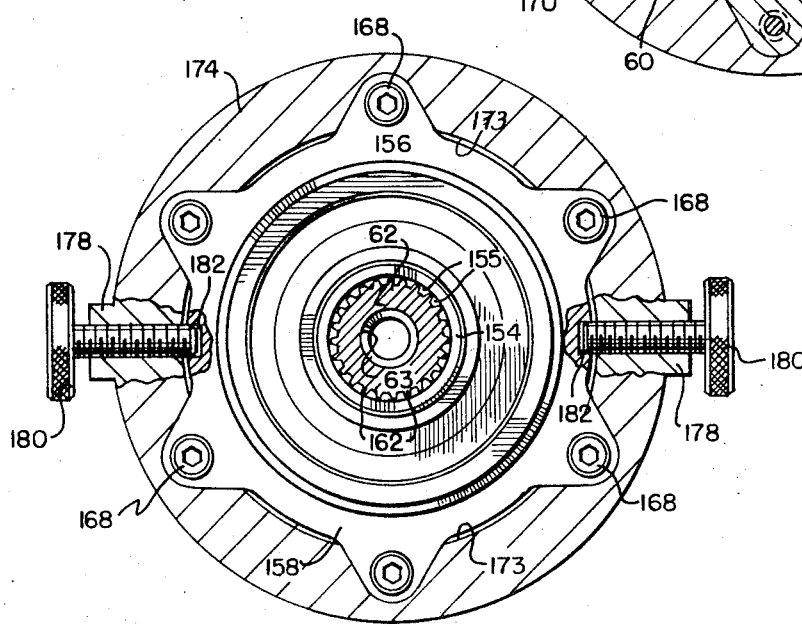
FIG. 13 is a transverse sectional view taken on line 13—13 of FIG. 2B.

Housing 60 also includes an intermediate annular spacer section 164 positioned between previously mentioned partitions 136 and 144. These several sections of housing 60 are bolted together by sets of bolts arranged circumferentially around the housing, a first set of bolts 166 serving to hold housing members 70, 136 and 164 together, while a second set of bolts 168 similarly clamps end wall 158 and partition 144 to the intermediate spacer section 164. The end cap 92 is of course also clamped by bolts 94 to casing section 70 as already mentioned. The peripheral configuration of the several housing sections, and the arrangement of the bolts holding them together, are best illustrated in FIGS. 11, 12 and 13. As will be seen, the outer peripheries of housing sections 136, 164, 144 and 158 take the form roughly of a six-pointed star due to provision of ribs 170 running longitudinally along the surfaces of those members. At its left hand end as seen in FIG. 2A, tubular housing section 70 is formed with an integral external flange 172. At its opposite end, six radially projecting lobes 173 coincide with the peripheral configuration of the abutting housing sections 136. The respective housing bolts 166, 168, are located on centers of the ribs and lobes of these housing sections. The star-shaped housing configuration provides longitudinal guide tracks, for a purpose now to be explained.

Drill unit 20 is provided with an outer sleeve 174 which, when fully telescoped over the working end of the unit as seen in FIGS. 2A, 2B, extends along the housing substantially and abuts external flange 172 of housing section 70. Sleeve 174 is formed internally to complement the outer periphery of the telescopingly received sections of housing 60, providing longitudinal channels 176 within which the several ribs and lobes 170, 173, are received in radially interlocked but axially slidable relation. Sleeve 174 may accordingly be extended from the position illustrated in FIGS. 2A, 2B to one in which it projects axially from the working end of the drill unit by sliding it along the guide ribs and lobes of the housing. FIG. 1 shows sleeve 174 in such extended position. With further reference to FIG. 13, sleeve 174 is formed with a pair of diametrically opposed external bosses 178 which threadly receive knurled locking screws 180. Pairs of cooperating locking detents 182, of which only one pair is here illustrated, are spaced axially along casing 60 so that sleeve 174 may be locked in various extended positions relative to the casing. The arcuate segments 173 defining the inner periphery of sleeve 174 form a guide track, and a bronze sleeve bearing 182 (FIG. 2B) is supported by these segments for axial reciprocation. This sleeve bearing is mounted on a traveling annular guide block 184 having a ball bearing 186 locked on its inner periphery by retainer 187 and castellated nut 188. The inner race of bearing 186 is clamped on the working end of arbor 62 by abutment between a shoulder formed by splines 162 on the shaft and retainer 187. Needle bearings 190 at the other end of the arbor provide for its rotation relative to motor shaft 64. These bearings also travel axially with the arbor, being retained against the forward end of splines 162 on the arbor by a lock ring 189. Traveling bearings 186, 190, thus provide radial support for arbor 62 in all positions between its axially retracted position as seen in FIGS. 2A, 2B and extended position as seen in FIG. 1. Snap ring 189 in the inner periphery of sleeve 174 adjacent its working end serves as a stop for limiting the outward extension of traveling guide 184 and arbor 62.

Powered reciprocation of arbor 62 is effected as seen schematically in FIG. 16. Hydraulic pressure from inlet port 122 is fed through flow restrictor valve 32 to a second manual four-way selector valve 36. Valves 32 and 36 are identical with their counterparts 30, 34, respectively. Hydraulic pressure from valve 36 is directed through internal ducting to the interior of arbor 62, to one face or the other of a stationary piston 192 which makes a sliding seal with the interior wall of the tubular arbor. Arbor 62 is closed adjacent tool socket 63 by a transverse partition 194, and a pressure seal and bushing assembly 196 (see FIG. 2A) centers the arbor on tubular piston rod 198 and closes the open end of the arbor, thus forming an actuating cylinder. Depending on the position of selector valve 36, fluid introduced to one side or the other of piston 192 produces axial extension or retraction of arbor 62. Further details of this are seen in FIGS. 2A, 2B, 5-12, and are described below.

Piston 192 is a composite structure comprising a central hub 200 which supports a rotatable sleeve member 202 making peripheral sliding and sealing contact with the inner surface 204 of the cylinder wall in arbor 62. (FIG. 2B) Rotatable member 202 is carried by tapered roller bearings 206 and is sandwiched between high pressure shear seals 208 which make sliding contact with axially opposite faces of the member. Seals 208 in turn are compressed between hub flange 210 and a lock nut 212 by compression spring 214.

The piston hub is welded to the ends of concentric inner and outer tubular piston rods 216, 218. The piston rods terminate at their opposite ends in a channelled plug 220 (FIG. 2A) which is screwed into axial bore 222 of end cap 92. Plug 220 is provided with an axial passage 224, and piston hub 200 is similar provided with an axial passage 226 to allow hydraulic fluid to be introduced through the plug, through inner piston rod 216 and through hub 200, and thus to the cylinder area located to the right in FIG. 2B of piston assembly 192. Access of fluid to the cylinder area on the axially opposite side (that is to the left in FIG. 2B) of piston assembly 192 is provided through passages 230 of channelled plug 220 communicating with the annular space between inner and outer piston rods 216, 218, and by ports 232 located circumferentially about outer piston rod 218 adjacent its junction with piston hub 200.

Again referring to FIGS. 5 through 8, the hydraulic communication passages for actuating arbor 62 longitudinally include high pressure inlet port 122, interconnecting duct 234 (FIG. 5) leading to restrictor valve 32, and duct 236 leading from that valve to manually controlled valve 36. Fluid in the later valve is directed to either of ducts 230 or 236 (FIGS. 6 and 7) in the end cap 92, depending on the valve position. These ducts connect respectively through plug 220 with the outer and inner passages formed by concentric connecting rods 218, 216.

TORQUE ADAPTER UNIT

Figure 15:
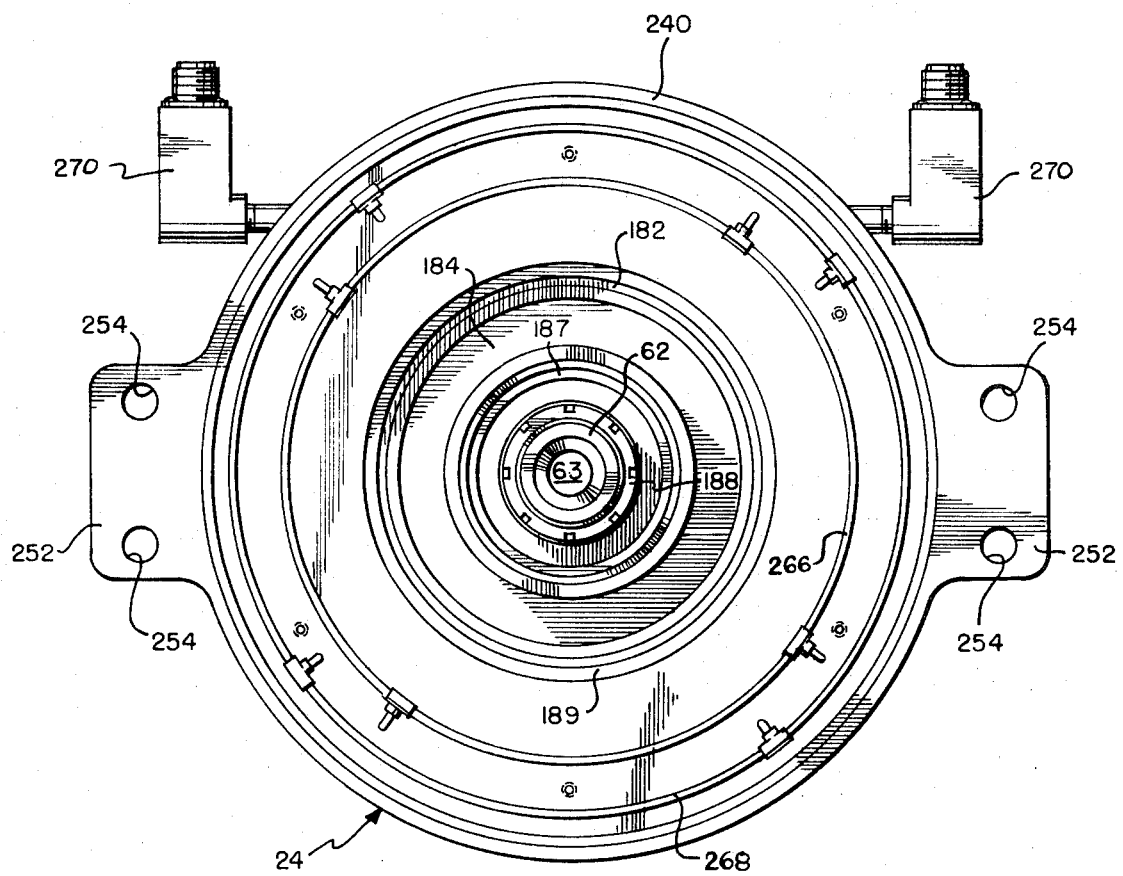
FIG. 15 is an end view taken on line 15—15 of FIG. 2B.

In order to support drill unit properly in position on work member M during a boring operation, as well as to provide indication of proper boring operation, torque adapter assembly 24 is provided for connection to the working end of the drill. As best seen in FIGS. 2B, 14 and 15, adapter 24 comprises a flanged collar 240 which fits about the outer, telescoping sleeve 174 of the drill unit, and is removably secured to the working end of the sleeve by a bayonet type interlock between an internal clamp ring 242 (FIG. 2B) carried by collar 240 and circumferentially offset portions 243 of channels or slots 244 milled in the outer periphery of the working end of sliding sleeve 174 to receive internal splines 246 of a torque ring 248. Drill unit 20 is assembled to the torque adapter 24 by inserting the working end of the drill into collar 242 and torque ring 248 after aligning spines 246 with channels 244, and then turning the drill unit relative to the collar to engage the bayonet lock. Locked engagement is maintained by clamp screw 250 and lock nut 251 of clamp ring 242, but limited circumferential displacement is permitted between torque ring 248 and collar 242 by elongating the holes 251 through which clamp screws 250 pass. Collar 240 is provided with diametrically opposed feet 252, as seen in FIG. 15, bored at 254 to accept bolts for bolting the adapter to the work member M which is to be bored. Collar 240 is counter-bored at 256 (FIG. 2B) to provide an annular seat facing the drill unit and torque ring 248 is seated in the counter-bore. The ring in turn forms a seat 260 limiting the insertion of the working end of sleeve 174 of the drill. Splines 246 of torque ring 248 interfit with the channels 244 in the end of sleeve 174 to prevent rotation between the drill and the torque ring. However, torque ring 248 and drill 20 are still capable of limited rotational movement relative to collar 240, as above mentioned, without disengagement of the bayonet lock. Such limited rotational movement, which is of the small order permitted by screw holes 251, is utilized to provide torque reading at some convenient remote location, during operation of the drill. For this purpose, ring 248 is formed in its outer periphery with torque arms 260 spaced equally about the ring. See FIGS. 14, 15. Torque reaction pistons 262 carried in cylinders 264 are positioned on either side of each torque arm 260, bearing against opposite sides of each arm. Two sets of pistons and cylinders are thus provided about the torque ring, the pistons in one set being effective to register twisting movement in one direction, while those of the opposite set are affective to register twisting movement of the opposite sense. The four cylinders 264 of one set are interconnected by hydraulic manifold 266, while the cylinders of the alternate set are connected by manifold 268. Each of manifolds 266, 268, communicates with one of pressure transducers 270 provided on the adapter, and the pressure indications are transformed by these transducers to electrical impulses for readout at a remote instrument to which they are connected by electrical conduits 272 (FIG. 1). Fluid reservoirs 274 supply fluid to each of the manifolds and piston assemblies.

MODIFIED DRILL UNIT

Figure 17:
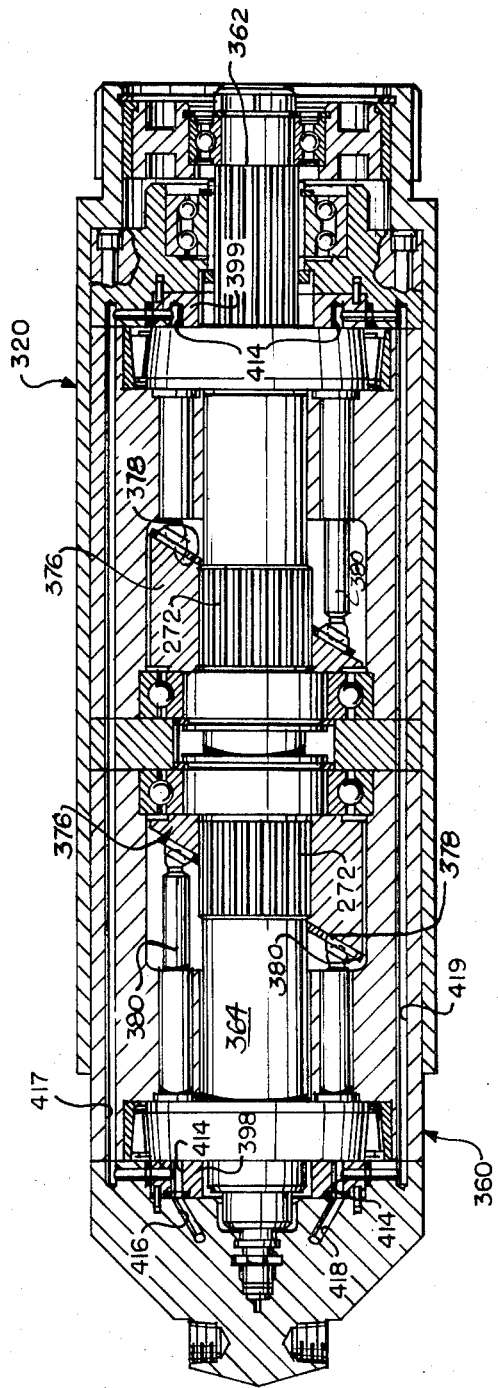
FIG. 17 is a fragmentary longitudinal sectional view, similar to FIGS. 2A, 2B, showing a modified drill unit in which a double-acting swash plate hydraulic motor is employed.

A drill unit 320 is shown in FIG. 17 which is, in general, identical with the previously described unit 20 except in respect to the motor drive and reduction gearing arrangement. In FIG. 17, the unit illustrated employs a dual swash plate motor arrangement providing a centrally balanced torque output to the motor shaft. In this case, the planetary reduction gear train described in the foregoing embodiment is omitted, since the power developed by this unit is sufficient for most purposes to make such gearing unnecessary.

It will be apparent from FIG. 17 that the right hand swash plate and piston arrangement as seen in this figure is in effect a mirror-image of the left hand unit which corresponds identically with that seen in FIG. 2A described above. The two swash plates 376 of FIG. 17 are splined to the respective hub sections 372 of axle 364 in back-to-back relation, with the working faces 378 of the two plates disposed in spaced, parallel planes, so that the maximum camming positions are 180° apart. In this way, thrust imposed by the respective pistons 380 is always balanced diametrically of the axle. Because of the greater torque output afforded by the double swash plate of this construction, axle 364 may be directly splined to arbor 362 without interposing any reduction gearing, and is so shown in the drawing. The only other significant change in construction from the unit previously described involves an additional internal ducting arrangement for paralleling the hydraulic pressure input and return lines for the two sets of swash plates and pistons. This is accomplished by paralleling supply pressure lines 416, 418, from the respective passages 414 in torque plates 398, 399, by means of auxilliary ducts 417, 419 which run axially through casing 360.

What is claimed is:

1. In a portable hydraulic power tool,
   a tubular work arbor that is both rotatively driven and axially reciprocable;
   a tubular casing closed at its ends, said arbor being axially reciprocable in a first, working end of said casing between extended and retracted positions, and bearing means for said arbor permitting both rotational and axial motion thereof;
   a torroidal hydraulic motor within said casing, and an axially fixed tubular axle in said motor within which said work arbor is telescopingly received;
   drive means transmitting rotary motion from said axially fixed motor axle to said axially shiftable arbor, said drive means including means permitting said axial reciprocation of said arbor;
   an actuating cylinder formed internally of said arbor, and means at said working end of said arbor for connection of a tool thereto;
   an actuating piston located in said arbor cylinder, forming a slidable seal with the cylinder wall, and a piston rod extending into said cylinder from an end of said casing to fix said actuating piston axially in position relative to said casing while said arbor is moved axially relative thereto; and
   a first set of hydraulic pressure inlet and return ducts in said casing communicating with said motor, a second set of pressure inlet and return ducts communicating with respectively opposite sides of said piston, and manual control valve means for each of said sets of pressure inlet and return ducts.

2. A portable hydraulic power tool as defined in claim 1, wherein said motor is of the swash plate type and in which the swash plate and swash plate pistons are disposed concentrically around and substantially axially midway along said tubular motor axle.

3. A portable hydraulic power tool as defined in claim 2, wherein said swash plate motor is of the double-acting type incorporating swash plates in back-to-back position with the maximum camming positions diametrically opposed, each plate having a set of swash plate pistons acting upon its face.

4. A portable hydraulic power tool as defined in claim 1, which includes planetary reduction gearing arranged coaxially with said tubular arbor within said casing, said reduction gearing interconnecting said motor axle and said rotary drive means for said arbor.

5. A portable hydraulic power tool as defined in claim 1, wherein said piston rod comprises inner and outer tubular members defining separate ducts forming portions of said second set of pressure inlet and return ducts.

6. A portable hydraulic power tool as defined in claim 5, wherein said actuating piston is composed of a central non-rotatable hub supporting a rotatable sleeve member, said sleeve member making peripheral sliding and sealing contact with the cylinder wall, non-rotating shear seals mounted on axially opposite sides of said sleeve member, and means urging said shear seals against opposite end faces of said sleeve member.

7. A portable hydraulic power tool as defined in claim 1, which further includes a casing extension for radially supporting a portion of said arbor bearing means, said extension being mounted on said tubular casing adjacent the working end thereof.

8. A tubular hydraulic power tool as defined in claim 7, wherein said extension is an axially adjustable sleeve extendable from the working end of said casing.

9. A portable hydraulic power tool as defined in claim 1, which further includes torque adapter means for coupling said tool to a work piece, said adapter having a socket for receiving the working end of said tool and locking it against rotation relative to the work piece.

10. A portable hydraulic power tool as defined in claim 9, wherein said torque adapter includes a fixed member adapted to be secured temporarily to the work piece, a torque ring journaled in said fixed member and having means for making splined connection to said tool casing, a torque arm on said torque ring, and means carried by said fixed member and engaged by said torque arm to sense the torque moment between said fixed member and torque ring produced by operation of said tool.

11. In a portable hydraulic power tool having an arbor that is both rotatively driven and axially reciprocable, the combination which comprises
   an arbor and a tubular casing at a working end of which said arbor is telescopingly received, closure means at the opposite end of said casing and seal means encircling said arbor to close said working end of said casing and provide a fluid-tight joint thereat while permitting both rotation and axial reciprocation of said arbor, and axially reciprocable bearing means adjacent opposite ends of said arbor supporting the same in said casing;
   a fluid motor enclosed within said casing, said motor having an axially fixed tubular axle within which said arbor is telescopingly received, and longitudinally fixed bearing means supporting said motor axle in said casing;

said arbor having an external longitudinal spline and said motor including an annular internally-splined drive member telescopingly receiving said arbor and mating with the spline thereon, said drive member being connected to said motor to transmit rotary motion to said arbor while permitting simultaneous axial reciprocation thereof;

fluid pressure inlet and return ducts leading from the exterior of said casing to said motor, and manual control means interposed in said ducts for controlling the flow of hydraulic fluid to said motor;

said arbor also being tubular and being closed adjacent its working end to form a cylinder opening interiorly of said casing, a piston rod having one end fixedly secured in said casing end closure, and a piston head secured to the other end of said rod and received in said arbor cylinder to form a fluid tight sliding and rotating seal with the wall of said cylinder, said arbor cylinder also having a sliding rotary seal fixed at its inner end encircling and making a fluid tight joint with said piston rod;

separate fluid passages leading through said piston rod and communicating respectively with the interior of said cylinder on opposite sides of said piston head, and pressure inlet and return ducts leading from the exterior of said casing to said fluid passages, including manual control means interposed in said ducts for controlling the flow of hydraulic fluid to said arbor cylinder;

a traveling block supported by said casing for axial reciprocation relative to its said working end, said block carrying one of said axially reciprocable arbor bearing means; and power take-off means on said arbor at said working end of said tool.

12. A portable hydraulic power tool as defined in claim 11, which further includes a sleeve telescopingly received over the working end of said casing, said traveling block being supported by said sleeve for axial reciprocation therein, said casing and sleeve having axially extending, radially interlocking portions on their adjacent surfaces to prevent relative rotation between them.

13. A portable hydraulic power tool as defined in claim 12, wherein said casing is formed externally to provide longitudinal ribs and said sleeve is formed internally to provide complementary channels within which the ribs make an axial sliding fit.

14. A portable hydraulic power tool as defined in claim 13, wherein said sleeve ribs form an axially extending guide track for said traveling bearing block at the working end of said casing.

15. A portable, hydraulically powered drill having a rotatable and axially reciprocable drill arbor,
   a generally tubular casing having a drill bit receiving end, and fluid fittings adjacent the distal end of said casing for connection thereto of hydraulic fluid pressure and return lines, and valve means for manually controlling the admission of hydraulic fluid pressure to said drill unit;
   a hydraulic motor disposed within said casing, and conduit means providing hydraulic pressure communication between said motor and a first member of said valve means whereby the speed of rotation of said motor can be varied by an operator;
   an externally splined tubular shaft journalled within said casing for rotation and axial reciprocation and constituting said drill arbor, said arbor being rotatively driven by said motor through said spline and having a drill chuck at an exposed end thereof, said tubular arbor being closed internally adjacent its chuck end to provide an actuating cylinder within said drill casing;
   a piston located within said arbor cylinder, said piston forming a fluid tight but slidable fit with the inner surface of said cylinder, and a piston rod extending into said cylinder, being fixed at its respectively opposite ends to said piston and to said casing; and conduits in said casing and piston rod communicating opposite faces of said piston with a second member of said valve means to permit manual control of hydraulic powered extension and retraction of said tubular shaft relative to said casing;
   a traveling bearing block secured to said tubular shaft at its drill bit receiving end, and extension means on said drill unit forming a longitudinal guide and radial support for said bearing block throughout axial extension and retraction of said arbor.

16. In a portable drilling apparatus for boring large diameter holes, the combination which comprises a hydraulic pressure supply unit, a drill unit, a high pressure flexible conduit means connecting said pressure supply and drill units in a closed-loop hydraulic system, said drill unit comprising:
   a tubular casing having manual control means for controlling the hydraulic pressure supplied to said drill unit;
   a fluid motor located in said casing, and conduits in said casing providing hydraulic pressure communication between said manual control means and said fluid motor;
   an externally splined tubular arbor rotatively driven by said motor through said spline, said arbor being journalled in said casing to expose an end thereof for longitudinal reciprocation between retracted and extended positions relative to a working end of said casing, said tubular arbor being closed adjacent its exposed end to provide an actuating cylinder internally in said casing and being formed at its exposed end to provide tool attachment means;
   a piston located in said actuating cylinder and forming a fluid-tight sliding seal with the interior wall thereof, and a piston rod, to one end of which said piston is connected, said rod extending coaxially of said arbor and being fixed at its other end to said casing;
   seal means between said piston rod and tubular shaft providing a fluid-tight but slidable closure at the inner end of said actuating cylinder, and fluid ducts in said casing and piston rod communicating the opposite faces of said piston with said hydraulic control means to permit hydraulic powered extension and retraction of said arbor;
   a traveling support secured to said exposed end of said arbor, said traveling support including radial bearing means for centering said end of said arbor.

* * * * *

UNITED STATES PATENT AND TRADEMARK OFFICE
CERTIFICATE OF CORRECTION

PATENT NO. : 3,726,348
DATED : April 10, 1973
INVENTOR(S) : Anthony J. Sergan

It is certified that error appears in the above-identified patent and that said Letters Patent is hereby corrected as shown below:

On the title page, Item (76) Inventor, should read

-- Anthony J. Sergan --.

Signed and Sealed this

Twentieth Day of July 1982

[SEAL]

Attest:

Attesting Officer

GERALD J. MOSSINGHOFF

Commissioner of Patents and Trademarks